(12) United States Patent
Haakonsen et al.

(10) Patent No.: US 7,386,432 B1
(45) Date of Patent: Jun. 10, 2008

(54) WEB SIMULATOR

(75) Inventors: Karl Haakonsen, Roslindale, MA (US); Stas Taraschansky, Natick, MA (US); Bryan Bergeron, Brookline, MA (US); Raymond C. Kurzweil, Newton, MA (US)

(73) Assignee: Medical Learning Co., Inc./Web Simulator, Wellesley Hills, MA (US)

( * ) Notice: Subject to any disclaimer, the term of this patent is extended or adjusted under 35 U.S.C. 154(b) by 531 days.

(21) Appl. No.: 09/603,604

(22) Filed: Jun. 26, 2000

Related U.S. Application Data

(60) Provisional application No. 60/162,876, filed on Nov. 1, 1999.

(51) Int. Cl.
G06G 7/48 (2006.01)
G06G 7/58 (2006.01)
G06F 15/177 (2006.01)

(52) U.S. Cl. .................. 703/11; 709/220; 434/262; 434/366

(58) Field of Classification Search .................. 703/11; 434/262, 366; 709/220
See application file for complete search history.

(56) References Cited

U.S. PATENT DOCUMENTS

| 4,737,921 | A |   | 4/1988  | Goldwasser et al. |
| 4,907,973 | A |   | 3/1990  | Hon |
| 5,385,474 | A |   | 1/1995  | Brindle |
| 5,680,590 | A |   | 10/1997 | Parti |
| 5,727,950 | A | * | 3/1998  | Cook et al. .................. 434/350 |
| 5,769,640 | A |   | 6/1998  | Jacobus et al. |
| 5,791,907 | A |   | 8/1998  | Ramshaw et al. |
| 5,800,179 | A |   | 9/1998  | Bailey |
| 5,825,941 | A |   | 10/1998 | Linford et al. |
| 5,882,206 | A |   | 3/1999  | Gillio |
| 5,984,368 | A |   | 11/1999 | Cain |
| 6,050,826 | A |   | 4/2000  | Christianson et al. |
| 6,074,213 | A |   | 6/2000  | Hon |
| 6,077,082 | A |   | 6/2000  | Gibson et al. |
| 6,126,450 | A |   | 10/2000 | Mukai et al. |
| 6,167,362 | A |   | 12/2000 | Brown et al. |
| 6,195,680 | B1 | * | 2/2001 | Goldszmidt et al. ........ 709/203 |
| 6,246,975 | B1 |   | 6/2001 | Rivonelli et al. |
| 6,272,468 | B1 |   | 8/2001 | Melrose |
| 6,273,728 | B1 |   | 8/2001 | Van Meurs et al. |

(Continued)

OTHER PUBLICATIONS

"Bryan Bergeron, M.D. Assistant Professor of Anaesthesia" http://www.andeanehealth.homestead.com/files/Bergeron_bio.doc No date on reference. Printed from Internet on Sep. 17, 2003.*

(Continued)

*Primary Examiner*—Paul Rodriguez
*Assistant Examiner*—Ayal Sharon
(74) *Attorney, Agent, or Firm*—Fish & Richardson P.C.

(57) ABSTRACT

A method of providing a software application to different network clients from a server including maintaining one or more sets of state data, each set of state data describing the state of an instance of an application, each instance of an application corresponding to one or more network clients, updating the sets of state data in accordance with applications running on one or more computers connected to the server via a local area network and for at least one of the sets of state data generating an interface based on the set of state data and transmitting the generated interface to the corresponding network client(s).

32 Claims, 30 Drawing Sheets

U.S. PATENT DOCUMENTS

| | | | |
|---|---|---|---|
| 6,289,299 B1 | 9/2001 | Daniel, Jr. et al. | |
| 6,307,567 B1 | 10/2001 | Cohen-Or | |
| 6,321,258 B1* | 11/2001 | Stollfus et al. | 709/220 |
| 6,351,775 B1* | 2/2002 | Yu | 709/238 |
| 6,369,812 B1 | 4/2002 | Iyriboz et al. | |
| 6,389,464 B1* | 5/2002 | Krishnamurthy et al. | 709/220 |
| 6,449,653 B2* | 9/2002 | Klemets et al. | 709/231 |
| 6,519,050 B1* | 2/2003 | Eintracht et al. | 358/1.15 |
| 6,615,253 B1* | 9/2003 | Bowman-Amuah | 709/219 |
| 6,692,258 B1* | 2/2004 | Kurzweil et al. | 434/262 |
| 6,747,672 B1* | 6/2004 | Haakonsen et al. | 715/700 |
| 6,775,695 B1* | 8/2004 | Sarukkai | 709/219 |
| 6,972,775 B1* | 12/2005 | Haakonsen | 345/646 |
| 2001/0041992 A1 | 11/2001 | Lewis et al. | |
| 2003/0051036 A1* | 3/2003 | Wang et al. | 709/227 |
| 2003/0058277 A1* | 3/2003 | Bowman-Amuah | 345/765 |
| 2004/0138864 A1* | 7/2004 | Kurzweil et al. | 703/11 |
| 2006/0028490 A1* | 2/2006 | Haakonsen et al. | 345/646 |

OTHER PUBLICATIONS

Bergeron, B.P. "Challenges Associated with Providing Simulation-Based Medical Education", Proc. 2nd Annual IEEE Symposium on Computer-Based Medical Systems, pp. 114-116, 1989.*

Stein, L. and MacEachern, D. "Writing Apache Modules with Perl and C". Chapter 5, pp. 1/81 to 81/81, and Appendix F. Mar. 1999. http://www.kuzbass.ru/docs/apache_c_mod_perl/1.htm.*

Shaw et al. "Pedagogical Agents on the Web." Proc. Of the 3rd Annaul Conf. On Autonomous Agents. April, 199. pp. 283-290.*

PHP Manual. Index, Chapters 1, 2, 18, 34, and Appendicies A, B, C. © 1997-2003. Appendicies A, B, and C provide a detailed history of PHP and describe which functions were changed in which versions, dating back to PHP/FI in 1995. http://www.php.net/manual.*

Engelschall, R. "A Users Guide to URL Rewriting with the Apache Webserver." Mar. 9, 1999. http://www.engelschall.com//pw/apache/rewriteguide.*

Engelschall, R. "Website Balancing: Practical approaches for distributing HTTP traffic." WEBTechniques, Apr. 1998 issue.http://www.engelschall.com//pw/wt/loadbalance.*

Engelschall, R. "Apache HTTP Server Version 1.3: Module mod_rewrite URL Rewriting Engine". Not dated. Printed from intern on Sep. 17, 2003. http://httpd.apache.org/docs/mod/mod_rewrite.html.*

The "Apache Week—Apache 1.3.6 Guide". © 1996-2003. First published Mar. 26, 1999 http://www.apacheweek.com/features/guide13.*

The "Apache Week—Apache 1.2 Guide". © 1996-2003. First Published Jun. 6, 1997. http://www.apacheweek.com/features/guide12.*

Microsoft Press. "Computer Dictionary, 3$^{rd}$ Ed." © 1997. p. 27.*

Kootsey et al., "Presenting Systems Concepts in Physiology and Pharmacology with Simulation Applets in Java." Proc. of 23rd Int'l Conf. of the IEEE. Oct. 28, 2001. vol. 4, pp. 4032-4035.*

Grange et al., "Using Java to Embed Complex Simulation Media Into Surgical Training Environments." Proc. 2000 IEEE EMBs Int'l Conf. on IT Applications in Biomedicine. Nov. 9, 2000. pp. 190-196.*

Gorman et al. "Simulation and Virtual Reality in Surgical Education." Archives of Surgery. Nov. 1999. vol. 134, No. 11, pp. 1203-1208.*

Web-SP Web-based Simulation of Patients. Publications & References. http://websp.lime.ki.se/publications. Printed on Jun. 10, 2005.*

Mattheos, N. et al., "Technology and Media for Distance Learning in Academic Health Education." Journal of Dentistry: Educational Technology Section. Undated.*

Min, Rik. "The JavaTHESIS system." Int. J. of Continuing Engineering, Ed. and Life-Long Learning. vol. 9, No. 2/3/4, pp. 302-314. 1999. http://projects.edte.utwente.nl/pi/Papers/JavaTHESISsys.html.*

Blanchard, S. et al. "AIDA On-Line: A Glucose and Insulin Simulator on the WWW." Proc. 20$^{th}$ Int'l Conf. of IEEE Eng'g in Medicine and Biology Society. Nov. 1, 1998. vol. 3, pp. 1159-1162.*

Warrick, P.A. et al. "VRML-based Anatomical Teaching (VAT): Work in Progresss." Proc. 1998 IEEE Int'l Conf. on IT Applications in Biomedicine. May 17, 1998. pp. 71-75.*

Stamatakos, S.G. "Using VRML in a Client-Server Architecture to Visualize A Simplified Simulation Model of Tumor Growth in Vitro." Proc. 20$^{th}$ Annual Int'l Conf. of IEEE Eng'g in Medicine and Biology Society. Nov. 1, 1998. vol. 6, pp. 2834-2837.*

Shaw, E. et al. "Pedagogical Agents on the Web." Proc. 3$^{rd}$ Annual Conf. on Autonomous Agents. Apr. 1999. pp. 283-290.*

Stamper, David. Local Area Networks. Second Edition. © 1998. pp. 7-10, 21-22, 38, and 371-374.*

* cited by examiner

FIG. 14

1502 {
Object Model Key "Patient Views"
Object Model MMFile1 "Body Renderings\MorphMan\aprime.jpg"
Object Model MMFile2 "Body Renderings\MorphMan\bprime.jpg"
Object Model MMFile3 "Body Renderings\MorphMan\cprime.jpg"
Object Model MMFile4 "Body Renderings\MorphMan\dprime.jpg"

1504 {
Object Model Key "ROS Head"
Object Model MMFile1 "Body Renderings\MFaces\Neutral.jpg"

1506 {
Object ABD Key "Front Auscultation"
Object ABD MMFile "Body Renderings\New_Male_Fat\FatChBkMAus.jpg"
Object ABD Sound1 "Wav Files\Other\Bowel1.wav"
Object ABD Sound2 "Wav Files\Other\Bowel2.wav"
Object ABD Sound3 "Wav Files\Other\Bowel3.wav"
Object ABD Sound4 "Wav Files\Other\Bowel2.wav"

1508 {
Object ABD Key "Front Percussion"
Object ABD MMFile "Body Renderings\New_Male_Fat\FatChBkMPercuss.jpg"
Object ABD Sound1 "Wav Files\Percussion\PercusDull.wav"
Object ABD Sound2 "Wav Files\Percussion\PercusDull.wav"
Object ABD Sound3 "Wav Files\Percussion\PercusFlat.wav"
Object ABD Sound4 "Wav Files\Percussion\PercusFlat.wav"
Object ABD Sound5 "Wav Files\Percussion\PercusResonant.wav"
Object ABD Sound6 "Wav Files\Percussion\PercusResonant.wav"
Object ABD Sound7 "Wav Files\Percussion\PercusDull.wav"
Object ABD Sound8 "Wav Files\Percussion\Exclame.wav"

FIG. 15A-1

1510:
- Object Chest Key  "Front Auscultation"
- Object Chest MMFile  "Body Renderings\New_Male_Fat\FatChBkMAus.jpg"
- Object Chest Sound1  "Wav Files\Heart Sounds\Normal (A).wav"
- Object Chest Sound2  "Wav Files\Heart Sounds\Normal (P).wav"
- Object Chest Sound3  "Wav Files\Heart Sounds\Normal (T).wav"
- Object Chest Sound4  "Wav Files\Heart Sounds\Normal (M).wav"

1512:
- Object Chest Key  "Back Auscultation"
- Object Chest MMFile  "Body Renderings\New_Male_Fat\FatChBkMAus.jpg"
- Object Chest Sound1  "Wav Files\Breath Sounds\NormBSApex.wav"
- Object Chest Sound2  "Wav Files\Breath Sounds\NormBSApex.wav"
- Object Chest Sound3  "Wav Files\Breath Sounds\NormBSBase.wav"
- Object Chest Sound4  "Wav Files\Breath Sounds\NormBSBase.wav"
- Object Chest Sound5  "Wav Files\Breath Sounds\NormBSBase.wav"
- Object Chest Sound6  "Wav Files\Breath Sounds\NormBSBase.wav"

1514:
- Object Chest Key  "Back Percussion"
- Object Chest MMFile  "Body Renderings\New_Male_Fat\ChBkMPercuss.jpg"
- Object Chest Sound1  "Wav Files\Percussion\PercusResonant.wav"
- Object Chest Sound2  "Wav Files\Percussion\PercusResonant.wav"
- Object Chest Sound3  "Wav Files\Percussion\PercusResonant.wav"
- Object Chest Sound4  "Wav Files\Percussion\PercusResonant.wav"
- Object Chest Sound5  "Wav Files\Percussion\PercusResonant.wav"
- Object Chest Sound6  "Wav Files\Percussion\PercusResonant.wav"
- Object Chest Sound7  "Wav Files\Percussion\PercusFlat.wav"
- Object Chest Sound8  "Wav Files\Percussion\PercusFlat.wav"

FIG. 15A-2

1516 {
  Object CV Key      "EKG"
  Object CV MMFile1  "EKGs\Normsinr.jpg"
  Object CV Entry    "Normal sinus rhythm with no signs of past or current cardiac events."
}

1518 {
  Object Ext Key      "Extremities - Left Hand"
  Object Ext MMFile1  "Extrem\MNLHand.jpg"
  Object Ext Entry    "Left hand normal to inspection."
}

1520 {
  Object Ext Key      "Extremities - Right Hand"
  Object Ext MMFile1  "Extrem\MNRHand.jpg"
  Object Ext Entry    "Right hand normal to inspection."
}

FIG. 15A-3

```
1522 ⎰ Object Ext Key         "Extremities - Feet"
     ⎨ Object Ext MMFile1     "Extrem\MNFeet.jpg"
     ⎱ Object Ext Entry       "Feet normal to inspection."

1524 ⎧ Object Heent Key         "Eyes Exam"
     ⎪ Object Heent MMFile1     "Pupils\NormEyes.jpg"
     ⎨ Object Heent Entry       "Pupils equal, round, and reactive to light."
     ⎩ Object Heent Description "Pupils equal, round, and reactive to light."

1526 ⎧ Object Heent Key         "Retinal Exam"
     ⎪ Object Heent MMFile1     "Eye Exam\MorphRetSmall\a.jpg"
     ⎨ Object Heent Entry       "Normal retinal exam."
     ⎩ Object Heent Description "Retinal Exam."

1528 ⎧ Object Heent Key         "Tympanic Membranes"
     ⎪ Object Heent MMFile1     "Ear Exam\NormalEarBi.jpg"
     ⎨ Object Heent Entry       "Tympanic membranes intact, no signs of fluid bilaterally."
     ⎩ Object Heent Description ""

1530 ⎧ Object Heent Key         "Throat Exam"
     ⎪ Object Heent MMFile1     "Throat\M_Throat_hu.jpg"
     ⎨ Object Heent Entry       "Throat is free of lesions"
     ⎩ Object Heent Description "No lesions, tongue midline, no active carries, mild peridontal disease."
```

FIG. 15B-1

1532 {
  Object Neuro Key         "Speech Pattern"
  Object Neuro MMFile1     "Wav Files\speech\MspeechN.wav"
  Object Neuro Entry       "Normal speech pattern."
  Object Neuro Description "Click button to hear speech"
}

1534 {
  Object Neuro Key         "Gait"
  Object Neuro MMFile1     "Gait\MNGaitC.avi"
  Object Neuro Entry       "Normal gait."
}

1536 {
  Object Rad Key           "Chest Film"
  Object Rad MMFile1       "CXRs\NormalMale.jpg"
  Object Rad Entry         "Chest film normal. Trachea midline. No interstitial opacities."
}

1538 {
  Object Rad Key           "Skull Film"
  Object Rad MMFile1       "CXRs\NormalSkull.jpg"
  Object Rad Entry         "Skull film unremarkable. No masses or lesions visualized."
}

Evolution

1902 {
Name "Diet & Exercise"
Number_Trigger_Events 1
Trigger_Type Action
Trigger_Index "Diet & Exercise"
}

1904 {
Number_Initial_Inhibiting_Events 1
Initial_Inhibiting_Event_Type Evolution_Started
Initial_Inhibiting_Event_Index "Diet & Exercise"
Initial_Inhibiting_Event_Value 1
}

1906 {
Interim_Mode_Time 4
Interim_Mode_Units Days
}

1908 {
Number_Interim_Inhibiting_Events 0
Number_Evolutions_to_Cancel 0
}

Number_Evolving_Variables 4

1910a {
Variable_to_Evolve "Vital_Weight"
Importance 4
Target_Multiple 0.90
Target_Increment 1
Target_Variance 1
Time 62
Time_Units Days
Time_Variance 2
Curve_Index 1
Evolve_Variance 2
}

FIG. 19A

1910b {
- Variable_to_Evolve "Glucose, Fasting"
- Importance 3
- Target_Multiple 0.90
- Target_Increment 1
- Target_Variance 1.5
- Time 52
- Time_Units Days
- Time_Variance 1
- Curve_Index 1
- Evolve_Variance 1.25

1910c {
- Variable_to_Evolve "Glucose, Plasma"
- Importance 5
- Target_Multiple 0.95
- Target_Increment 1
- Target_Variance 1.25
- Time 42
- Time_Units Days
- Time_Variance 1
- Curve_Index 1
- Evolve_Variance 1.45

1910d {
- Variable_to_Evolve "Glucose, 2h Postprandial"
- Importance 2
- Target_Multiple 0.95
- Target_Increment 1
- Target_Variance 1.25
- Time 42
- Time_Units Days
- Time_Variance 1
- Curve_Index 1
- Evolve_Variance 1.75

End_Evolution

FIG. 19B

```
2000 ─┐
       Migration
       Name          "ACT"
       Comment       "Activated clotting Time"
       Units         "s"
       Variable              "ACT"
       Start         143 ⎫
       Min           114 ⎬ 2002
       Max           186 ⎭
       Time_Step     1       ⎫
       Time_Unit     Minutes ⎬ 2004
       Variance      0.4 } 2006
       Time_Jump     2
       End_Migration
```

```
Morph
Name      "vital_weightM"
Comment   "No Comment"
Variable  "vital_weight"
Min   164.0
Max   184.0
End_Morph
```

Object ROS Question   "Have you felt fatigued?"
Object ROS Answer   "Well, I do find myself more tired at the end of the day lately, even though my job hasn't changed in years."
Object ROS Keywords   "tire, fatigue, letharg"
Object ROS Entry   "Fatigued at the end of the day."
Object ROS MMFile1   "Body Renderings\FFaces\sullen.jpg"

Object Lab Test "Acetone"
Object Lab Description "No migration - Neg/Pos"
Object Lab Entry "Neg/Pos"

FIG. 27

Object Order Action "Acarbose"
Object Order Description "Oral Antidiabetic - Precose"
Object Order Entry "Given to patient PO; tolerated well"

FIG. 28

Object Physical Key "Oral Temperature"
Object Physical Text "Oral Temperature: $temperature$"

FIG. 29

```
COMPUTATION
Name              "Vital_BP_Diastolic"
Comment           "no comment"
Units             " mmHG"
Variable          "Vital_BP_Diastolic"
Method_Name"ComputeBPDiastolic"
Number_Arguments 1
Argument_Variable "Vital_BP_Systolic"
Variance    2
End_Computation
```

WEB SIMULATOR

PRIORITY CLAIM

This application relates to the following applications U.S. Ser. No. 09/603,368, entitled "Virtual Patient Hot Spots", filed Jun. 26, 2000, now U.S. Pat. No. 6,747,672; U.S. Ser. No. 09/603,045, entitled "Patient Simulator", filed Jun. 26, 2000, now U.S. Pat. No. 6,692,258; U.S. Ser. No. 09/603,422, entitled "Morphing", filed Jun. 26, 2000, now U.S. Pat. No. 6,972,775.

REFERENCE TO RELATED APPLICATIONS

This application relates to the following applications U.S. Ser. No. 09/603,368, entitled "Virtual Patient Hot Spots", filed Jun. 26, 2000; U.S. Ser. No. 09/603,045, entitled "Patient Simulator", filed Jun. 26, 2000; U.S. Ser. No. 11/195,905, entitled "Morphing", filed Aug. 3, 2005.

BACKGROUND

Desktop computer programs such as flight simulators, word-processors, and spreadsheets quickly respond to user input. Providing this kind of inter-activity over the Internet, however, has posed something of a challenge. This challenge stems, in part, from the simple communication model that describes most Internet traffic: clients (e.g., web-browsers) request pre-written web pages from servers, and the servers send the requested pages back for display.

Programmers have developed a number of different techniques to make web pages more inter-active. For example, some web pages include, or refer to, programs known as "applets." When a browser receives a web-page featuring an applet, the browser executes the applet instructions, for example, to receive user input, change a browser GUI (Graphical User Interface) display, and communicate with the server providing the web-page. Some applets, however, include a large number of instructions and can require a significant amount of time to travel over the Internet to a user's browser.

Another technique for making web pages more responsive to users involves dynamic generation of web pages by servers. For example, PHP (Personal Home Page), ASP (Active Server Page), and CGI (Common Gateway Interface) scripts can dynamically produce a web page based on script instructions and variables. Script processing, however, adds yet another task to web-servers faced with handling large bursts of browser requests for information.

SUMMARY

In an aspect, the invention features a method of providing a software application to different network clients from a server including maintaining one or more sets of state data, each set of state data describing the state of an instance of an application, each instance of an application corresponding to one or more network clients, updating the sets of state data in accordance with applications running on one or more computers connected to the server via a local area network and for at least one of the sets of state data generating an interface based on the set of state data and transmitting the generated interface to the corresponding network client(s).

In another aspect, the invention features a method of providing a virtual patient software simulator to different Internet web-browser clients from an Internet server, the method including maintaining one or more sets of state data, each set of state data describing the state of a virtual patient, updating the sets of state data in accordance with virtual patient simulators running on one or more computers connected to the server via a local area network and for at least one of the sets of state data dynamically generating HTML (Hypertext Markup Language) instructions for an web-browser based on the set of state data and transmitting the generated interface to a networked web-browser client.

Advantages of the invention will become apparent in view of the following description, including the figures, and the claims.

BRIEF DESCRIPTION OF THE DRAWINGS

Figure 14:
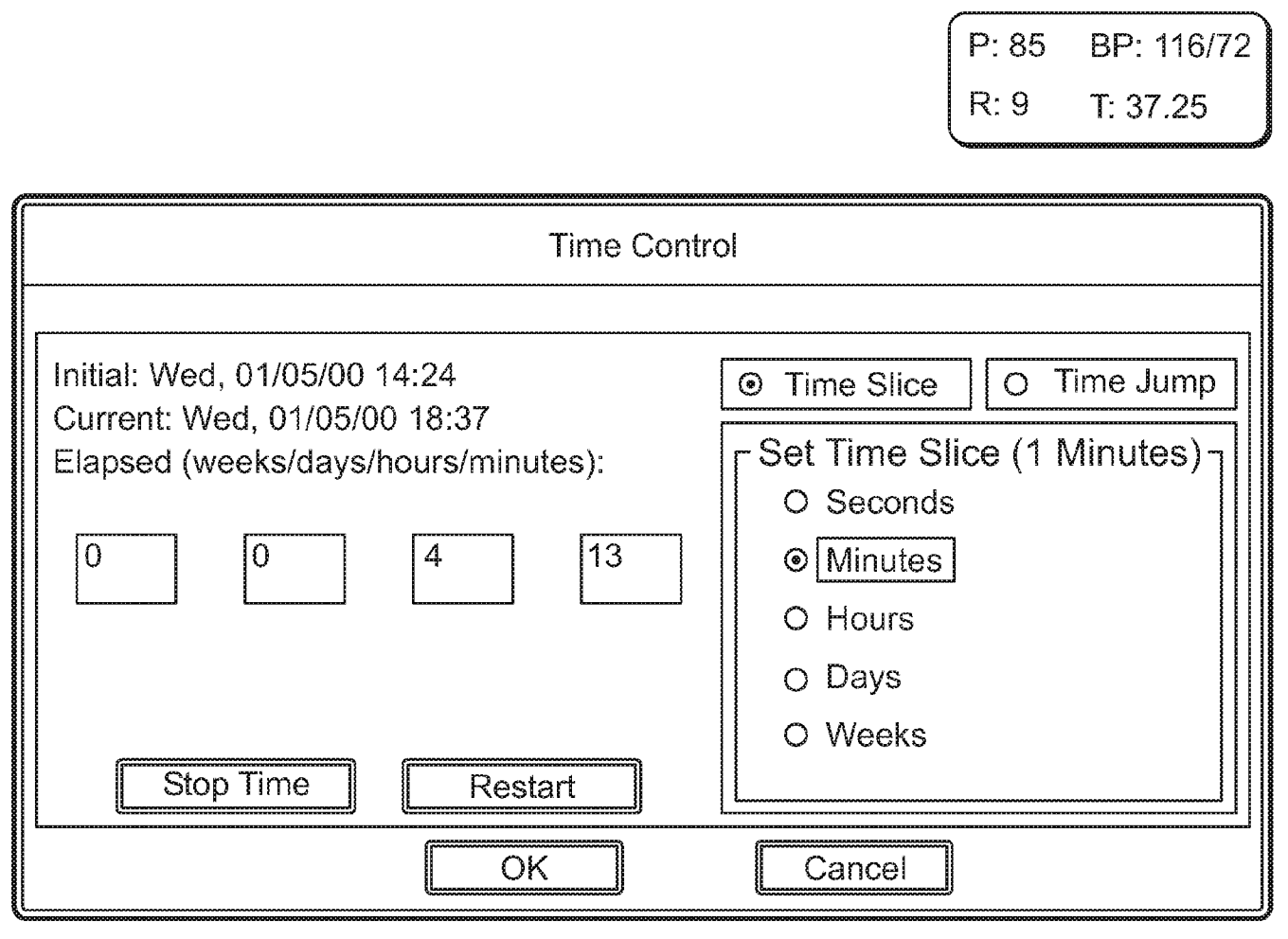

FIGS. 8-14 are screenshots of a user interface that presents a virtual patient.

FIGS. 15A and 15B are listings of statements associating multimedia files with different virtual patient characteristics.

FIG. 19 is a listing of statements defining an evolution.

FIG. 27 is a listing of statements defining a response to a lab test.

FIG. 28 is a listing of statements defining an action.

FIG. 29 is a listing of statements defining a response to physical examination.

FIG. 30 is a listing of statements defining a computation.

Like reference symbols in the various drawings indicate like elements.

DETAILED DESCRIPTION

A. Introduction

Figure 1:
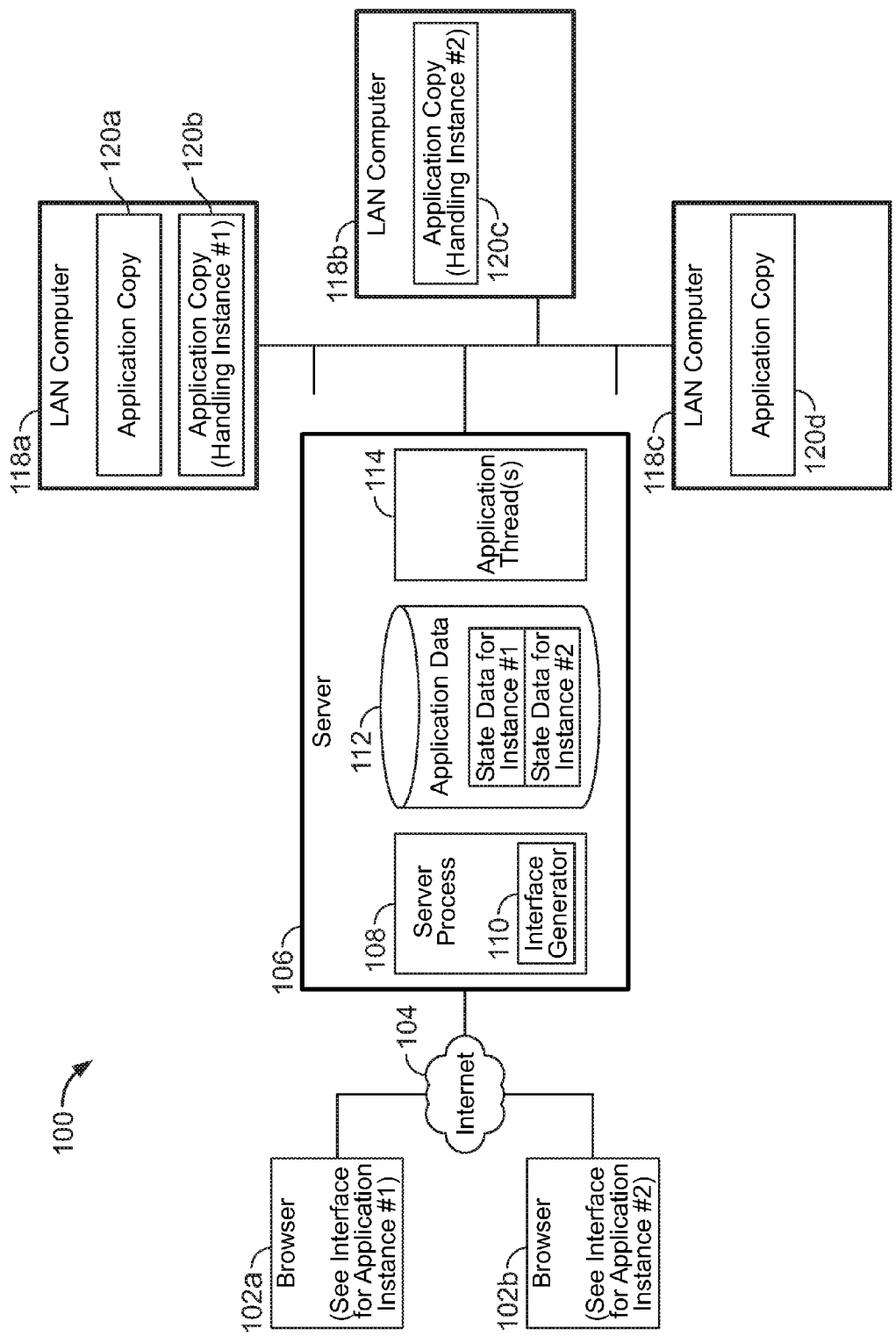
FIGS. 1 to 5 are diagrams illustrating a network application architecture.

FIG. 1 shows a system 100 that uses the Internet 104 as a vehicle for providing complex, interactive applications to a large number of network users operating ordinary web-browsers 102a, 102b (e.g., Microsoft™ Internet Explorer™). The architecture 100 provides each user with a different "instance" of the application. That is, each user perceives an application program responsive to that user's input, much like an ordinary program residing on the user's personal computer. In the scheme shown in FIG. 1, the web-browsers 102a-102b need not receive the actual application instructions, but instead receive interface instructions for constructing a browser display and presenting different user interface controls. The interfaces are like application facades with the real application instructions residing on a remote system.

As shown in FIG. 1, the system 100 includes a network server 106 that stores the "state" 112 of each application instance. State data 112 can include the current values of different variables used by an application. A single application can handle more than one "instance." For example, an application can read an instance's state data 112, perform some processing, update and store the instance's state data 112, and move on to another instance's state data.

Conceptually, state data 112 represents the intersection between local area network computers 118a-118c running different copies of an application 120a-120d and a process 108 that dynamically constructs web pages for each application instance. Applications 120a-120d continually operate and update the state data 112. Independently, the server 106 can process user input and prepare browser instructions (e.g., HTML (Hypertext Markup Language)) for each instance.

For example, in one embodiment, the applications 120a-120d provide users with a simulation of a patient medical exam (i.e., simulation of a medical exam to a "virtual" patient). The simulation enables network users to interact with web-page controls (e.g., buttons, icons, and text fields) to examine, diagnose, and attempt to return a virtual patient to health. For this application, the state data 112 can include a virtual patient's vital signs (e.g., heart rate, pulse, and weight), images or references to images of the virtual patient's current appearance, medical orders and queries received from the user, and other information. The medical simulation applications 120a-120d continually update the state data 112 for a patient to reflect the virtual patient's health. For example, the medical simulation applications 120a-120d may slowly decrease a virtual patient's weight over time when a user prescribes a diet. While the medical simulation applications 120a-120d run behind the scenes, an interface generator 110 uses the state data 112 to construct browser instructions that display an appearance of the user's virtual patient and provide information (e.g., a medical history) requested by the user.

The network system of FIG. 1 can handle the large numbers of users that typically visit popular web sites. For example, pooling the computational resources of the LAN computers 118a-118c enables the system 100 to support a large number of application instances. Additionally, the system 100 enables a network administrator to add computers to a local area network to further increase system "horse-power". Additionally, the server 106 does not need to deliver copies of the application 120a-120d to each network user. This can reduce network traffic. Keeping the application instructions on local area network machines also enables a site manager to easily replace and modify the applications, for example, to fix bugs or provide new features. This also prevents users from easily copying the programs. The system 100 also separates interface generation (server 106) from the actual "number crunching" (i.e., execution) of the application 120a-120d. This separation enables the server 106 to easily customize each user's interface. For example, more sophisticated computers or computers featuring faster network connections can receive interface instructions for more elaborate multimedia presentations.

B. Illustration of Operation

Figure 2:
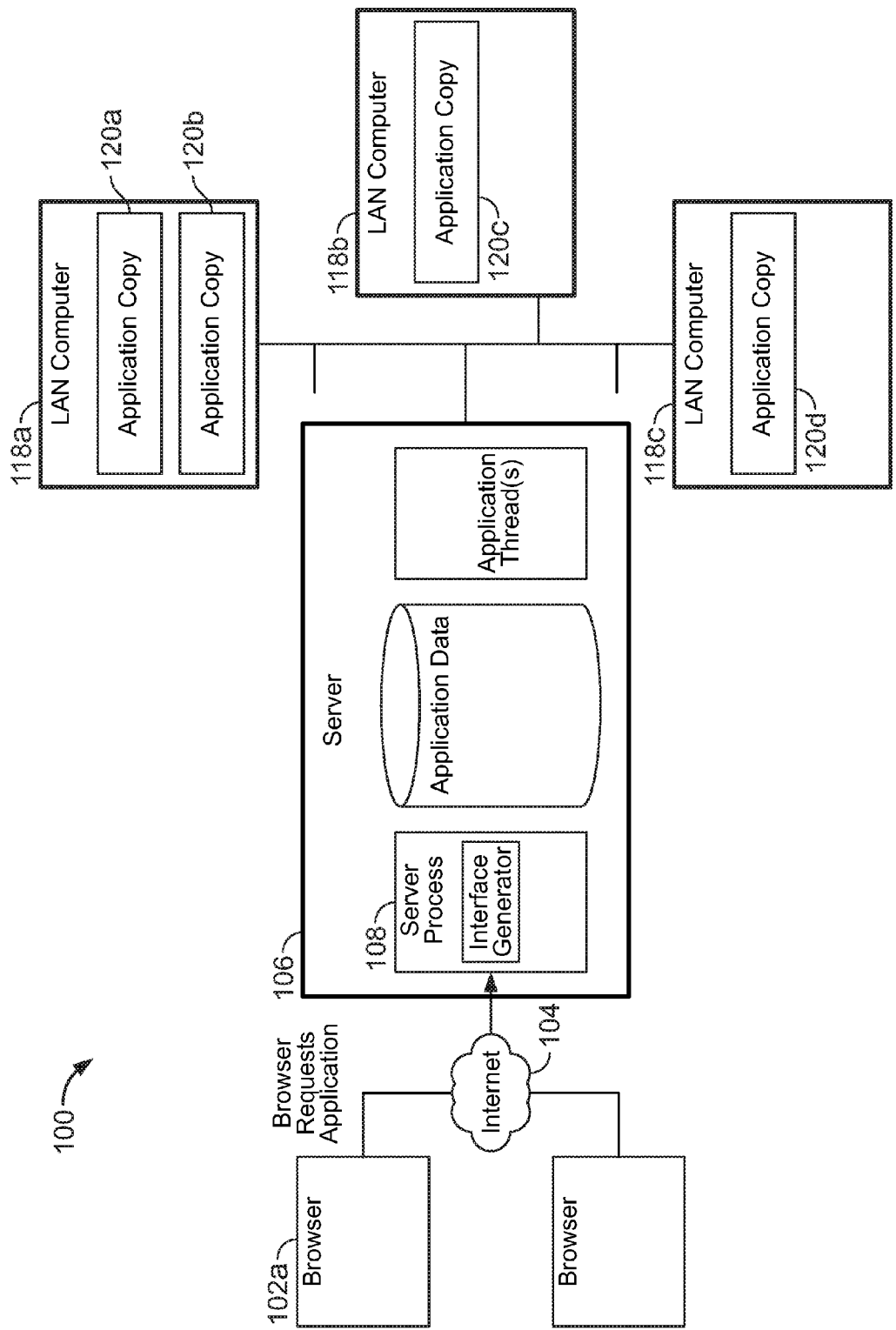
Figure 3:
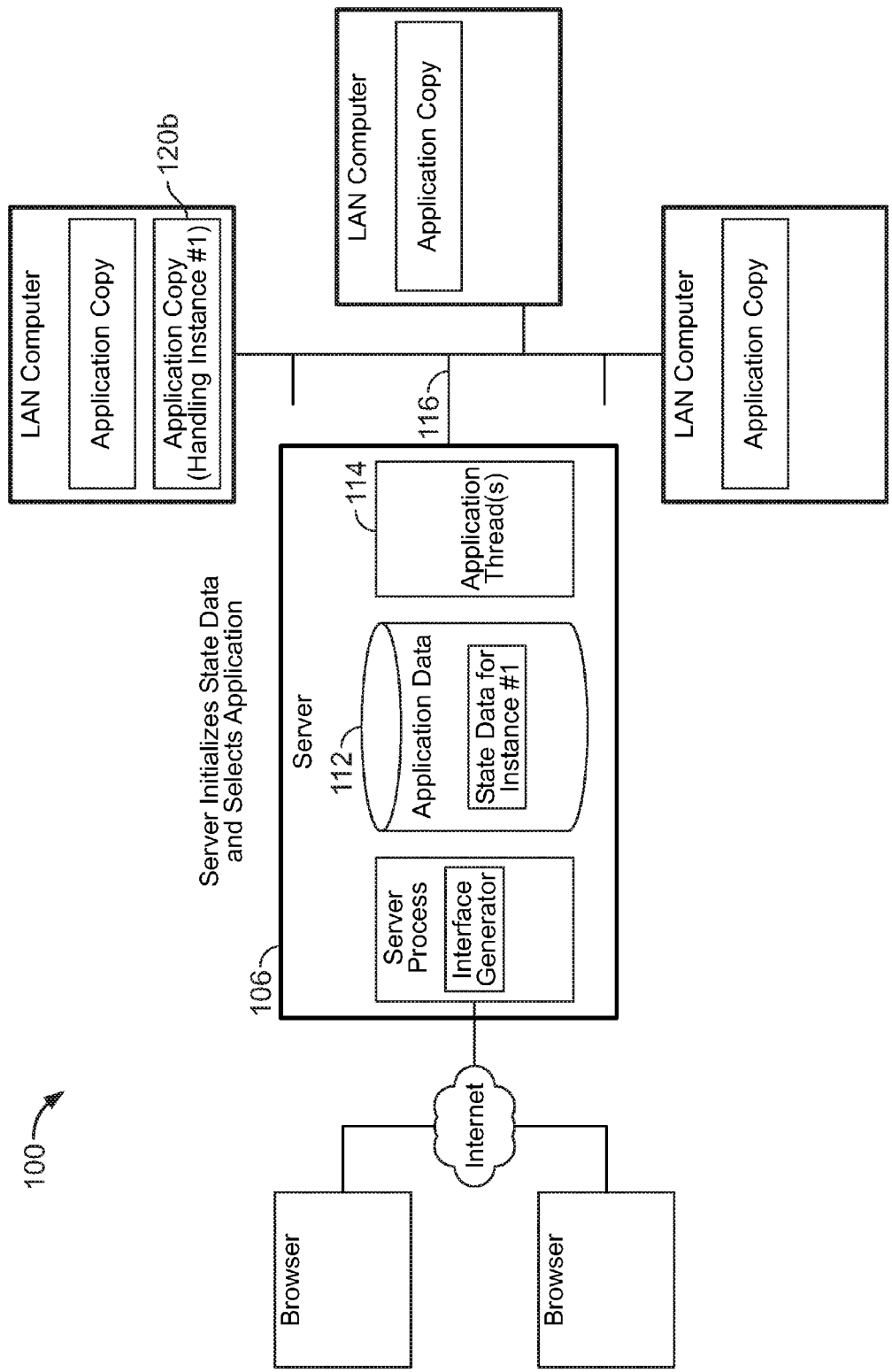
Figure 4:
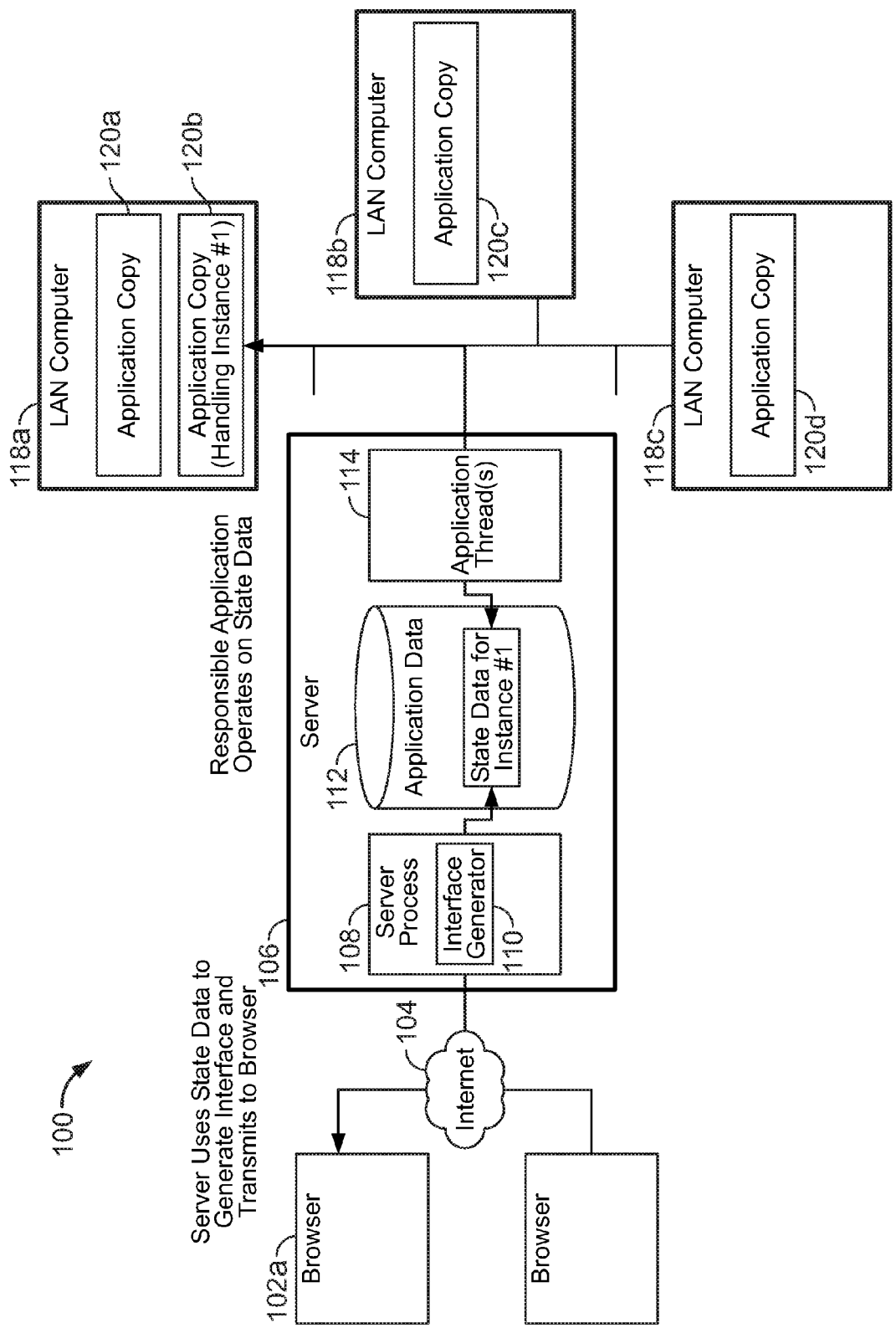

FIGS. 2-4 illustrate operation of the system 100. In FIG. 2, a user navigates browser 102a to the server 106, for example, by specifying the server's URL (Universal Resource Locator) (e.g., www.medicalsimulator.com). In response, as shown in FIG. 3, the server 106 initializes state data 112 for a new application instance. Initializing the state data 112 may include generating an identifier for the instance, for example, an identifier based on the IP (Internet Protocol) address of the user. The server 106 also selects an application 120a-120d to handle the instance. For example, the server 106 may select a particular application 120a-120d based on the current load of the different applications (e.g., load-balance based on how many different instances each application currently handles), the speed of the local area network computer running the application, and so forth.

As shown in FIG. 4, after initialization, communication with the user and execution of the application can proceed independently of one another, for the most part. For example, an application 120b can read and update state data 112 regardless of how frequently the server 106 transmits or receives data from application 120a. Thus, even if a user directs their browser to a different site, the application instance can persist and, potentially, continue. To continue the patient simulation example, even though a user visits a different site to check on stock prices, their patient's ailment will progress. The system does not strictly impose this independence. For example, the server 106 can control the application speed based on the speed of a users connection or how frequently the user interacts with an interface. The server 106 can also store the state data 112 to freeze an application instance for later use.

The server process 108 that handles user interaction can communicate with the "back-end" via the server 106 database 112. For example, the process 108 and application 120b can communicate using a technique known as "handshaking." Thus, a user may interact with an interface control (e.g., a form field on an HTML page) displayed by their browser to send user input to the server 106. The server 106 can write this input into the state data 112 for the user's application instance and set a handshake flag indicating the input requires application 120b processing. After the application 120b finishes its processing it can reset the handshake flag. The interface generator 110 may wait for the application 120b to reset the handshake flag before constructing a new interface.

Figure 5:
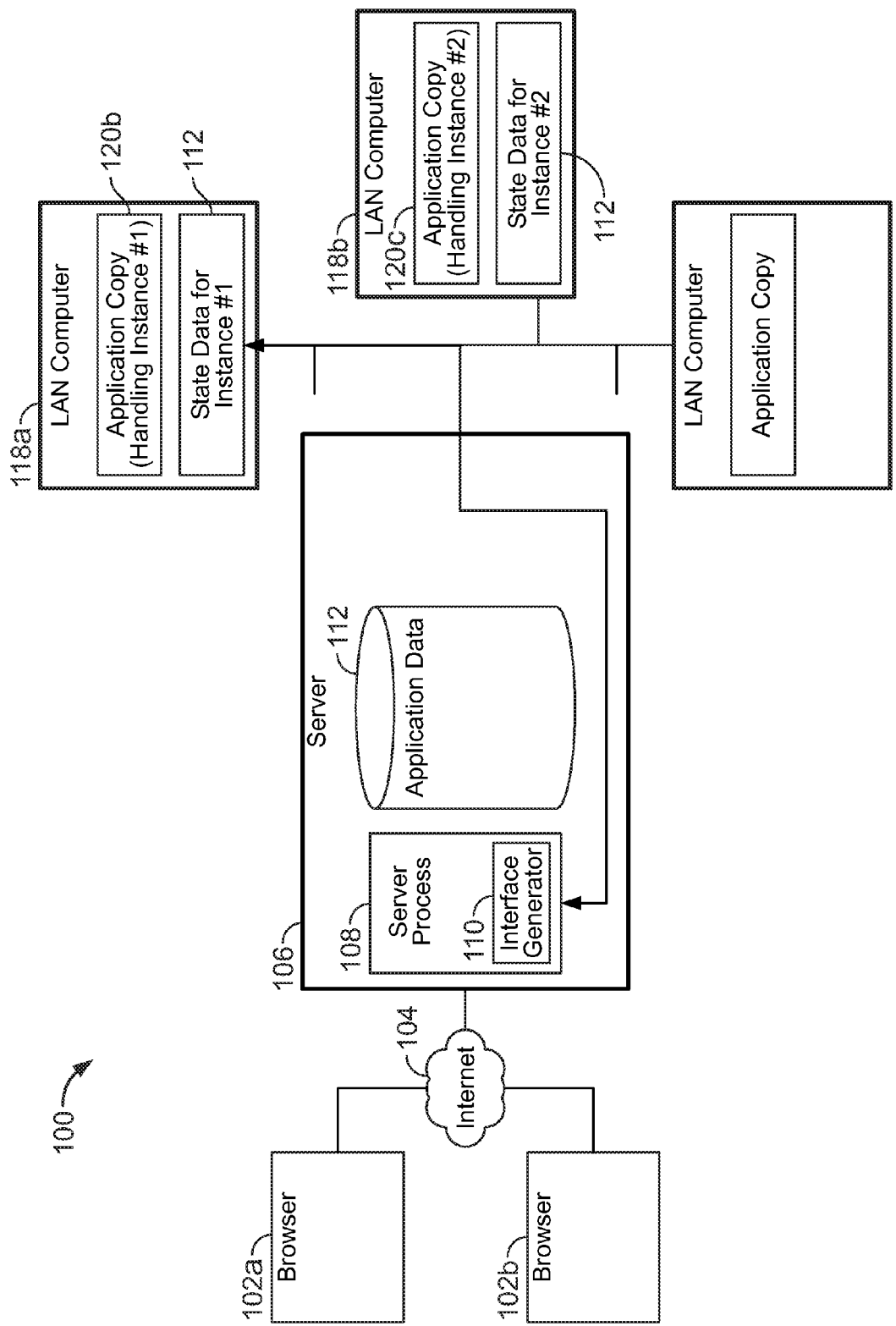

State data 112 may be distributed across different LAN computers 108a-108c instead of residing solely on the server 106. For example, as shown in FIG. 5, each application copy may maintain information for each instance locally. The interface generator 110 can retrieve the state data 112 from the LAN computers when constructing an interface.

C. Client/Server Operation

Figure 6:
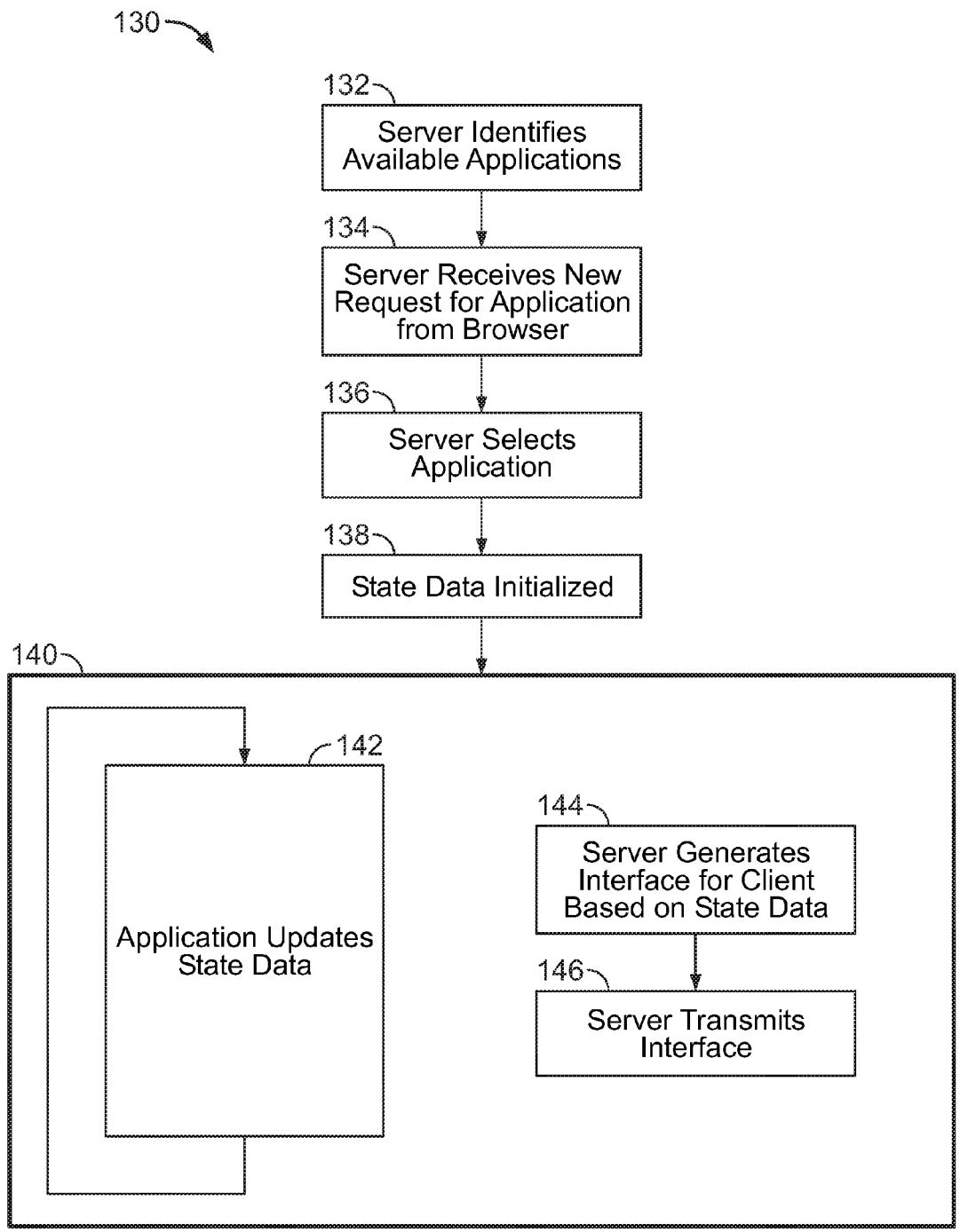
FIG. 6 is a flowchart of a server process for providing an application to different network users.

FIG. 6 shows a flowchart of a server operation 130. As shown, the server identifies 132 different applications running on the LAN computers. For example, the server may run a process or thread that establishes a connection (e.g., a "socket" connection) with each application that announces itself to the server. Though shown in FIG. 6 as initial activity of the server, identifying 132 available applications on the LAN computers can continue over time as different applications and LAN computers go on and off-line.

After receiving 134 a request from a user for an instance of an application, the server 106 selects 136 an application to handle the instance and initializes 138 the state data for that instance. Thereafter, the application can read and/or update the state data, for example, by issuing database commands over an ODBC (Open Database Connectivity) connection. The server also uses the state data to generate interface instructions that control the appearance of the application on a user's browser 142, 144.

The server 106 can construct an interface using a variety of techniques. For example, the interface generator can use PHP (Personal Home Page), ASP (Active Server Page), or CGI (Common Gateway Interface) scripts to dynamically generate HTML or XML (Extensible Markup Language) interface instructions. Typically, these pages will include instructions that read state data for an instance (e.g., by looking up the instance identifier), and, based on the state data values, construct a page of sounds, graphics, and user interface controls. The user interface controls may include "form field" controls and/or a "submit" button that receives user input and transmits 146 this input to the server for processing (e.g., www.medicalsimulator.com?action=CPR). The interface may also include instructions that periodically issue a request to the server 106 for an update.

Figure 7:
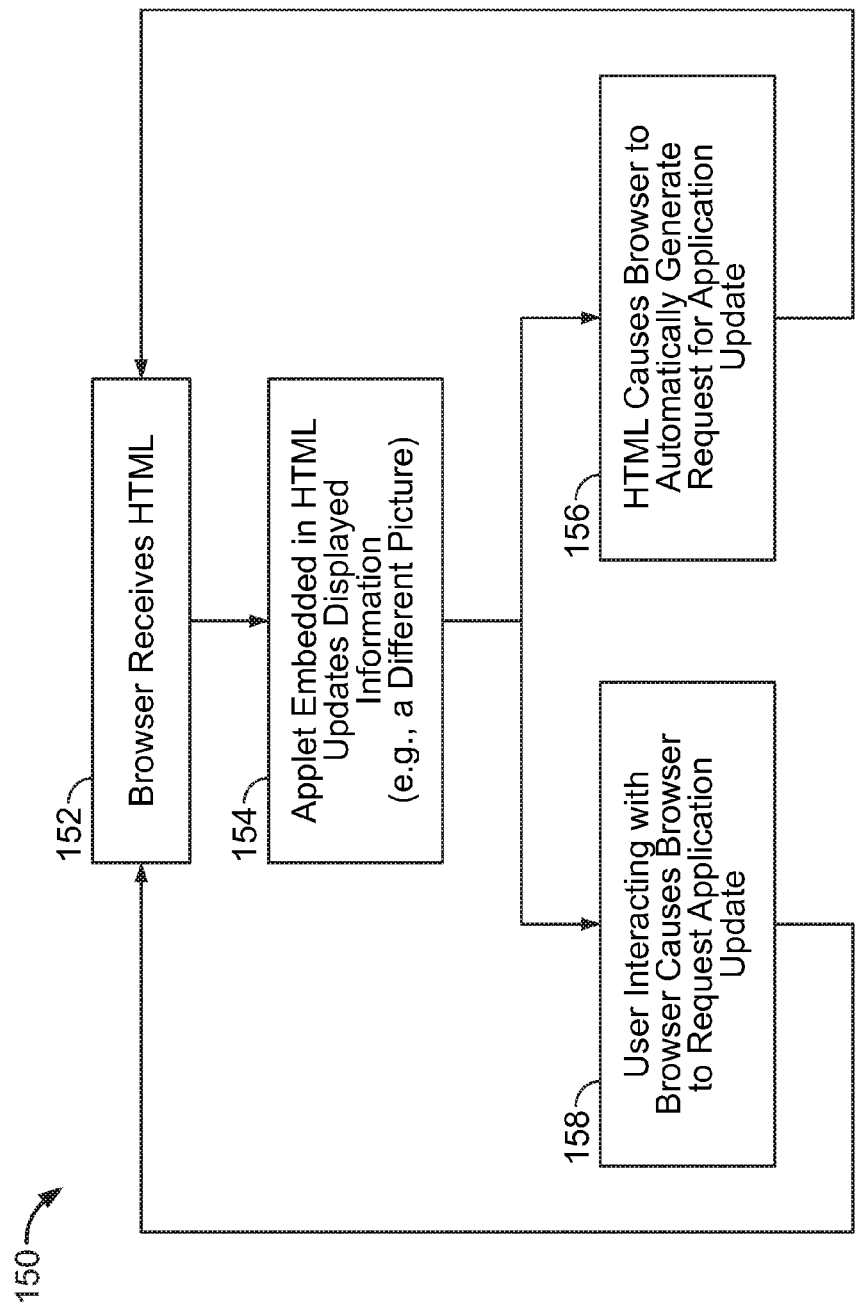
FIG. 7 is a flowchart of a client process for presenting a user interface to network users.
Figure 8:
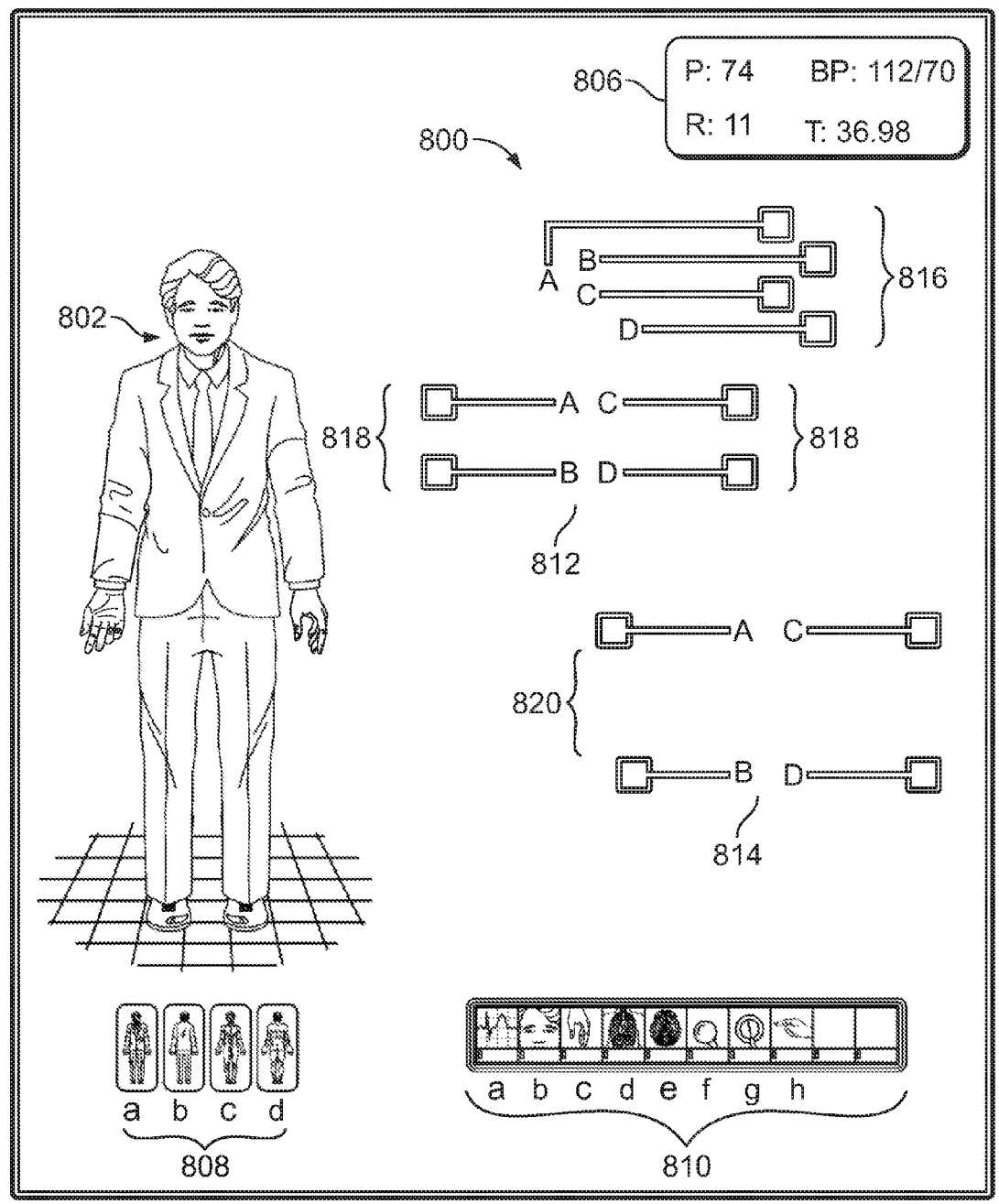
Figure 9:
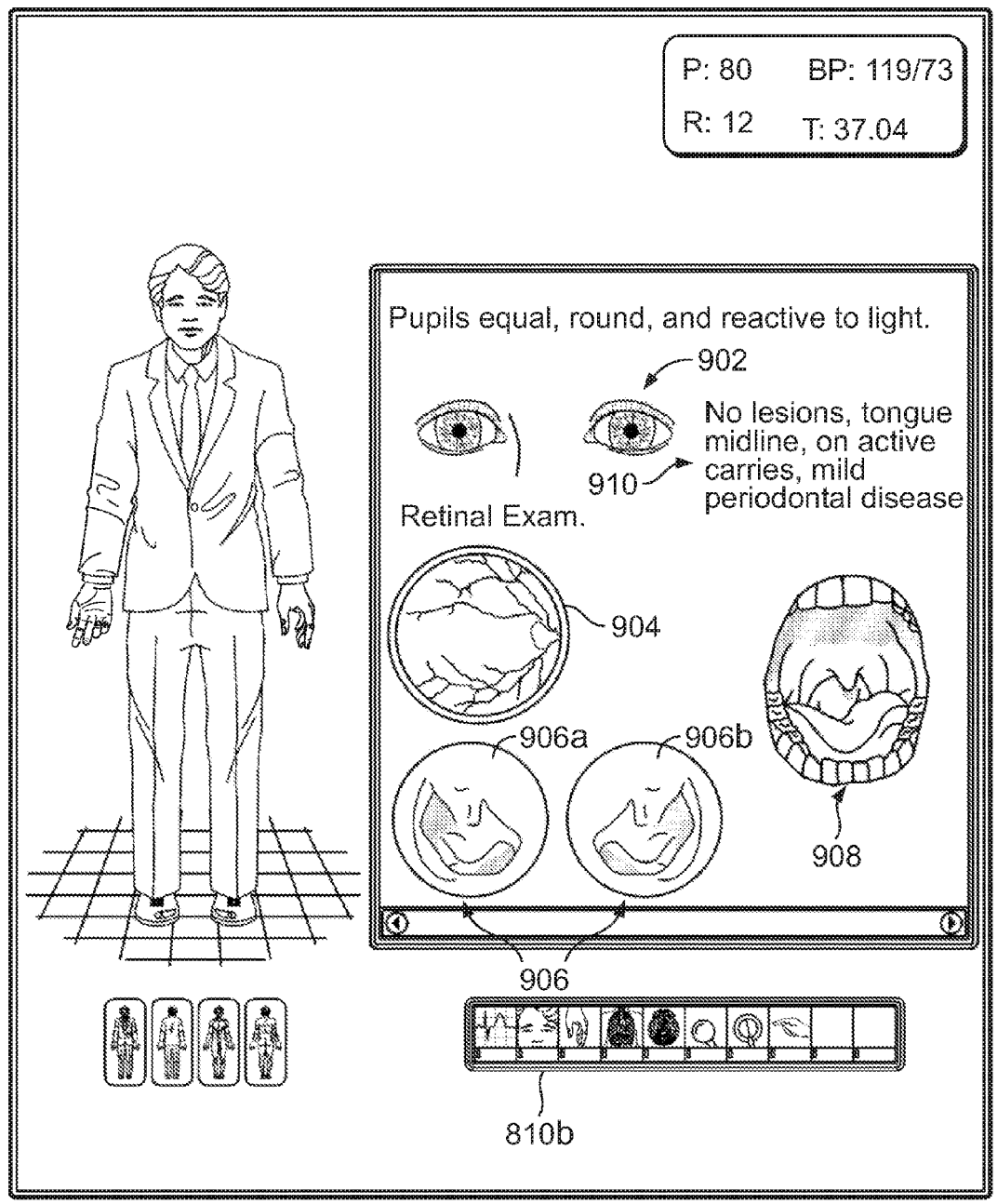
Figure 10:
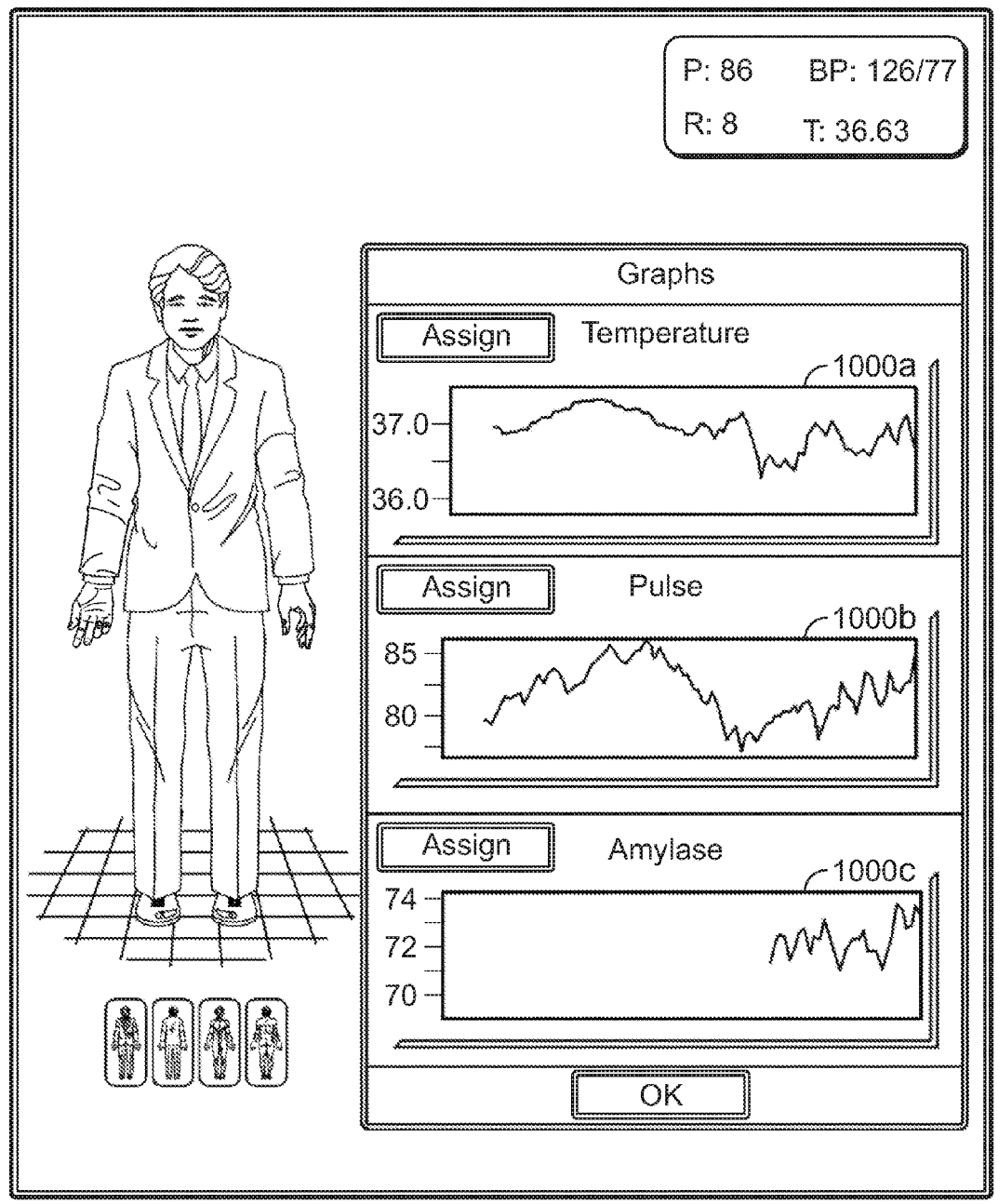
Figure 11:
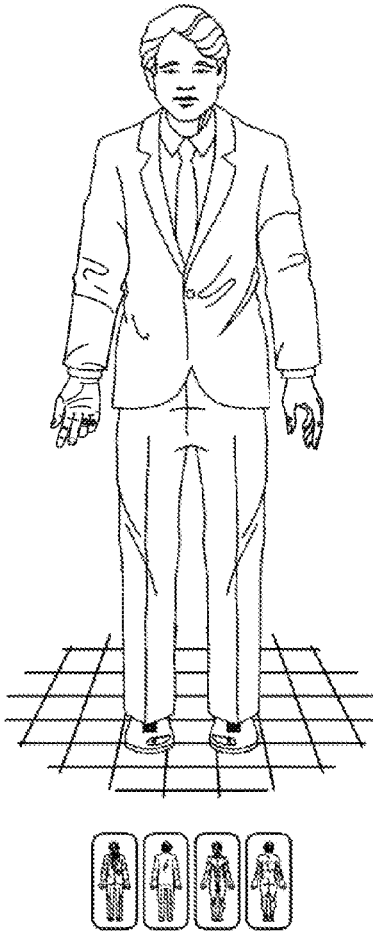
Figure 12:
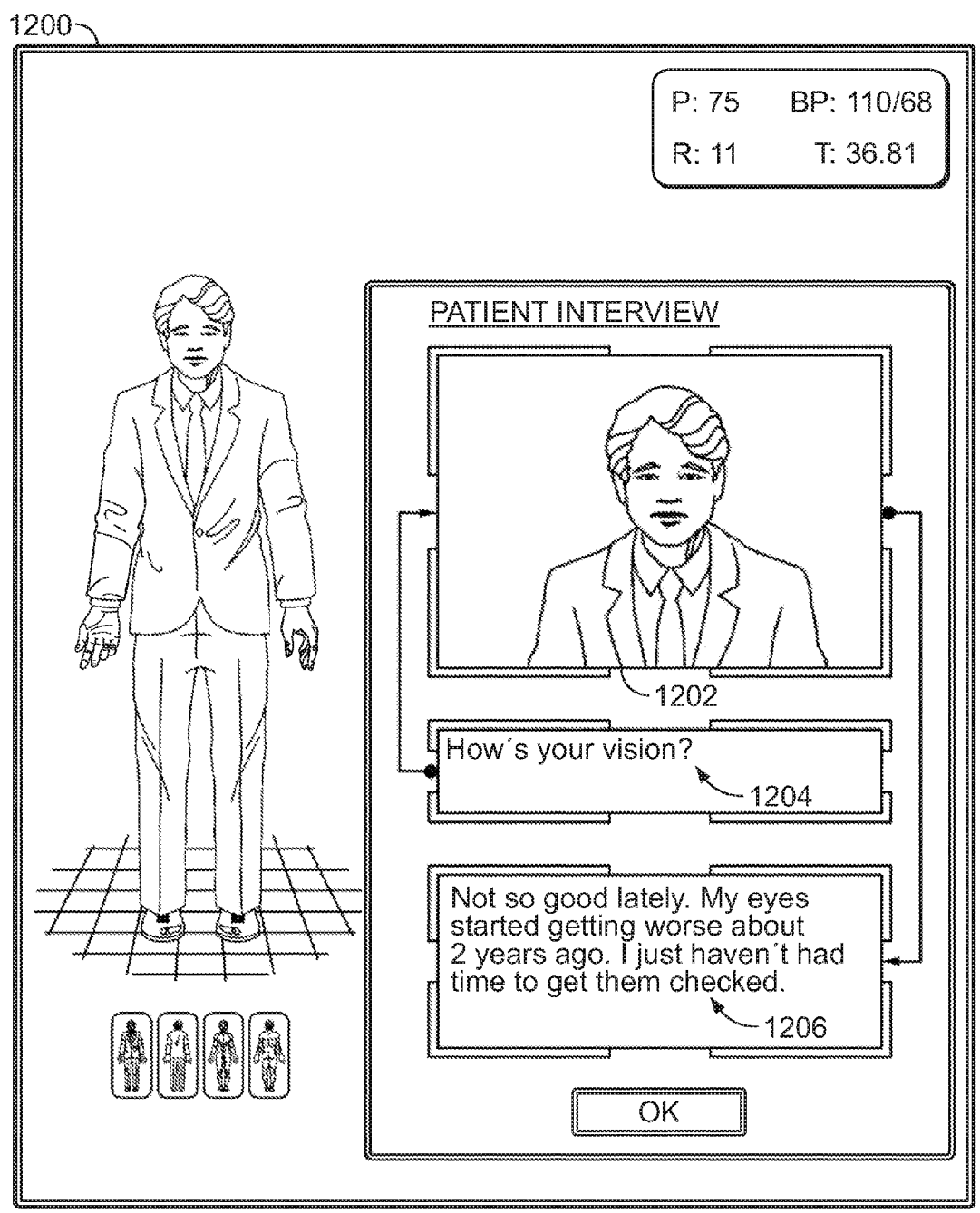
Figure 13:
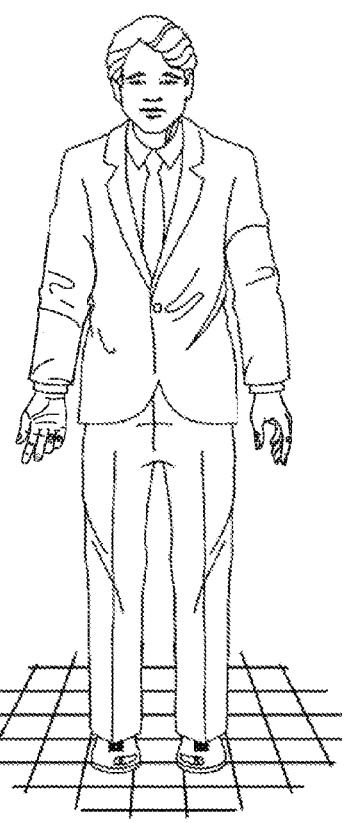
Figure 16:
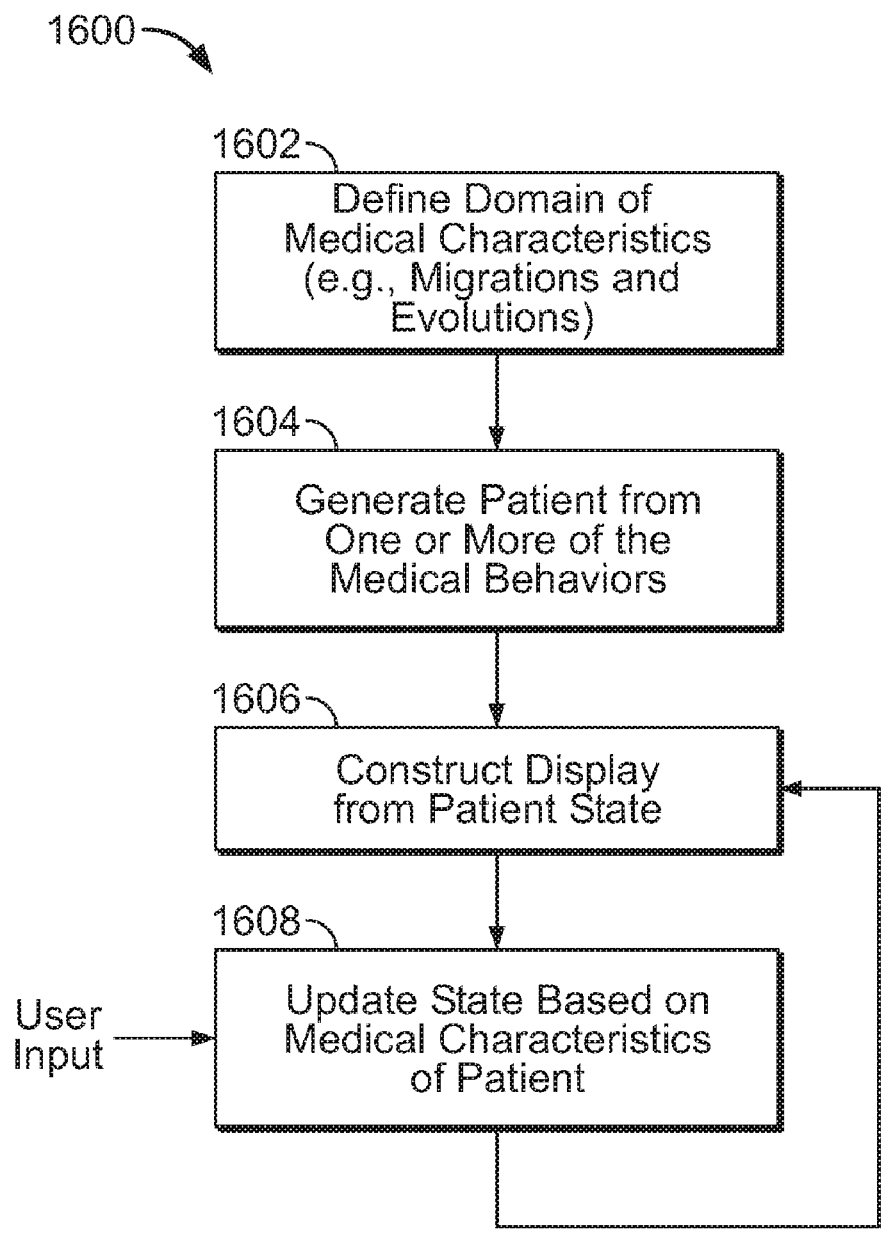
FIG. 16 is a flowchart of a process for providing a virtual patient.
Figure 17:
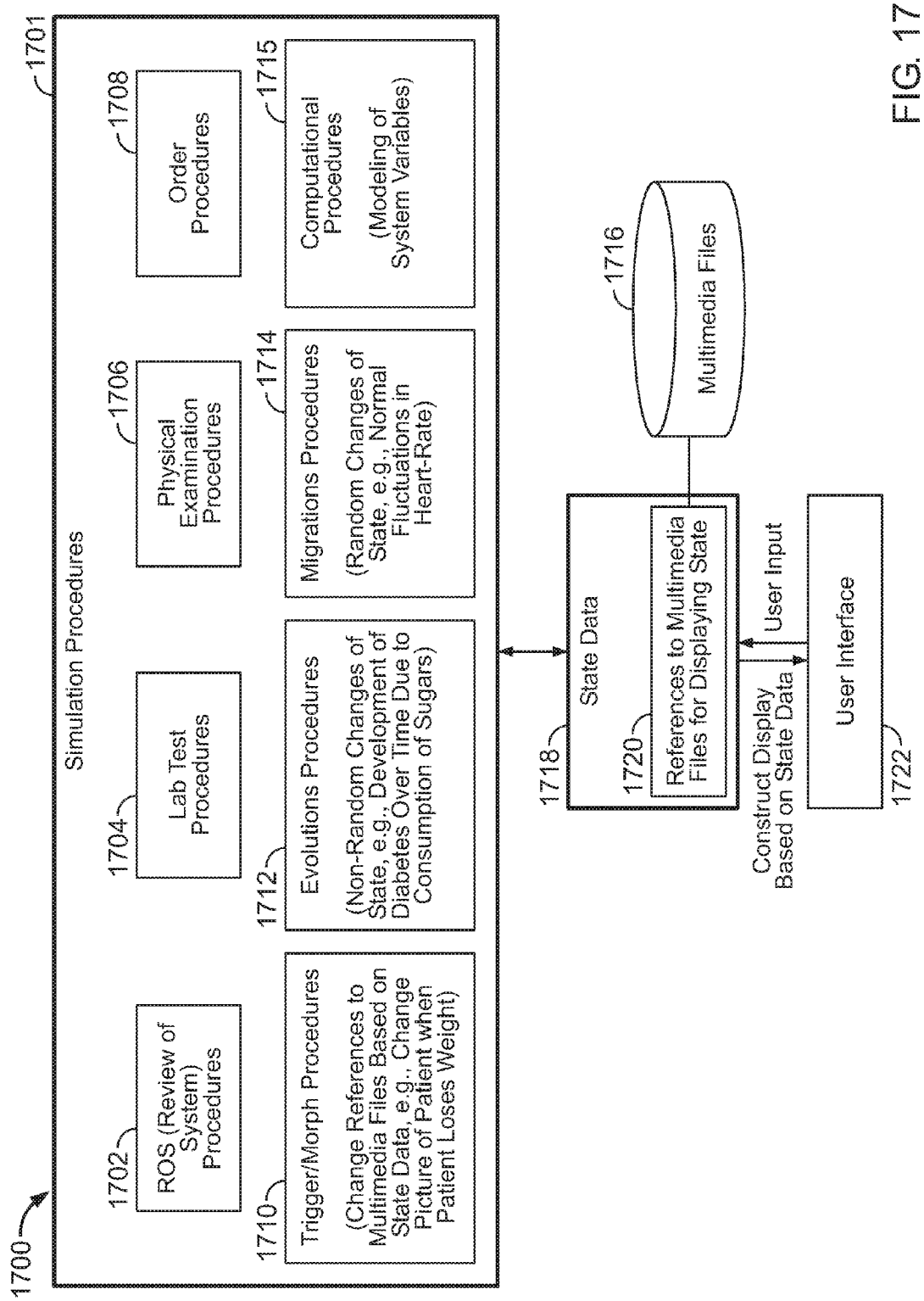
FIG. 17 is a diagram of a virtual patient simulator.
Figure 18:
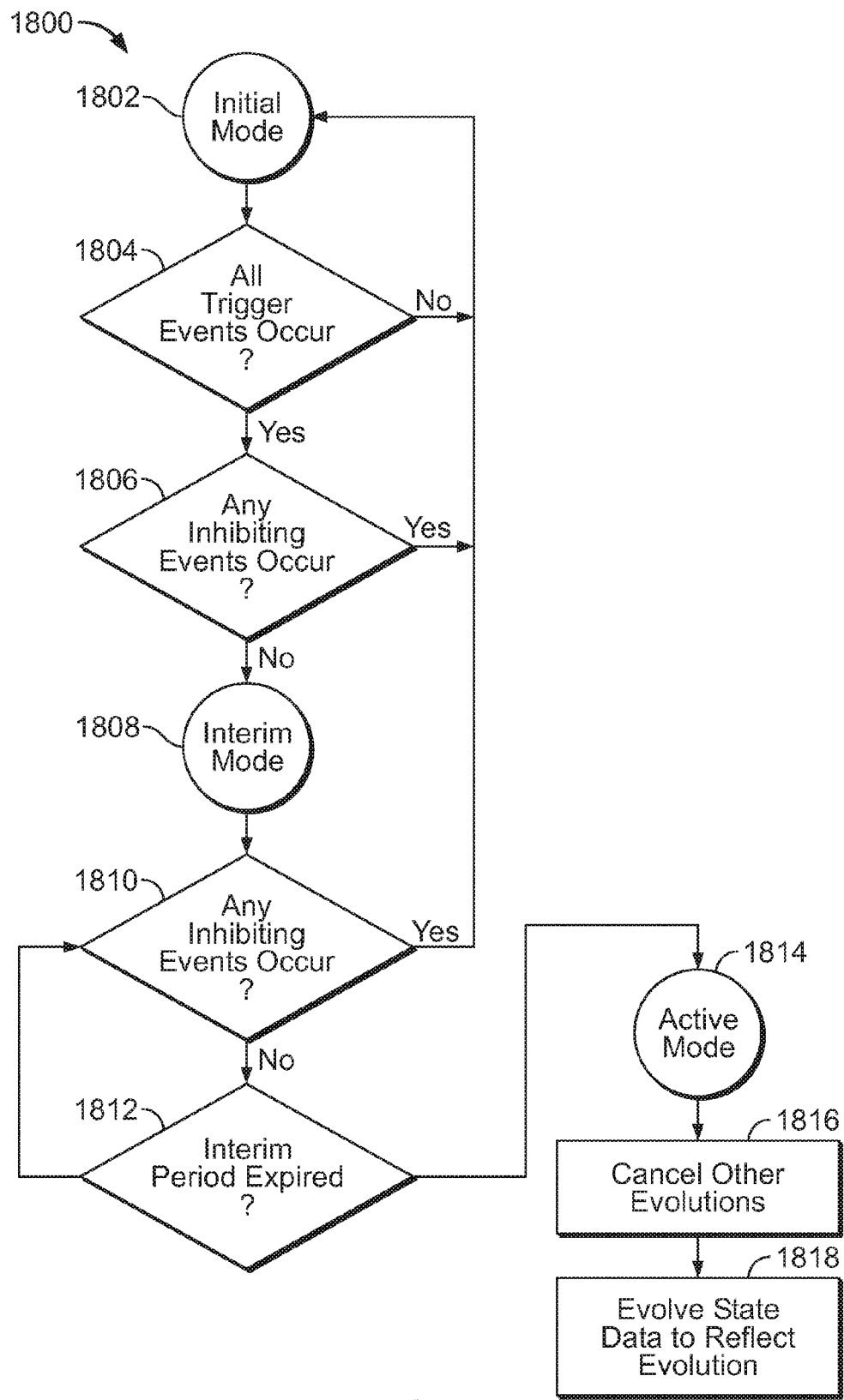
FIG. 18 is a flowchart of a process for evolving a medical condition.
Figures 20, 21:
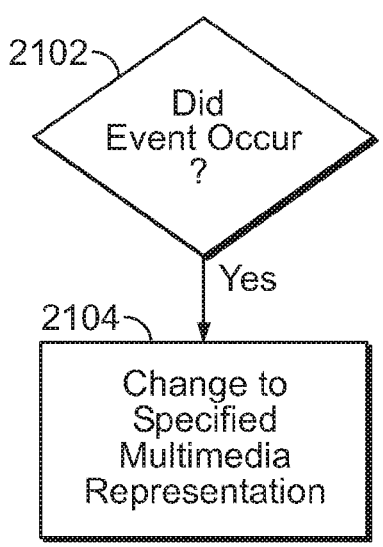
FIG. 20 is a listing of statements defining a migration.
FIG. 21 is a flowchart of a process for changing multimedia presentations associated with a virtual patient.
Figure 22:
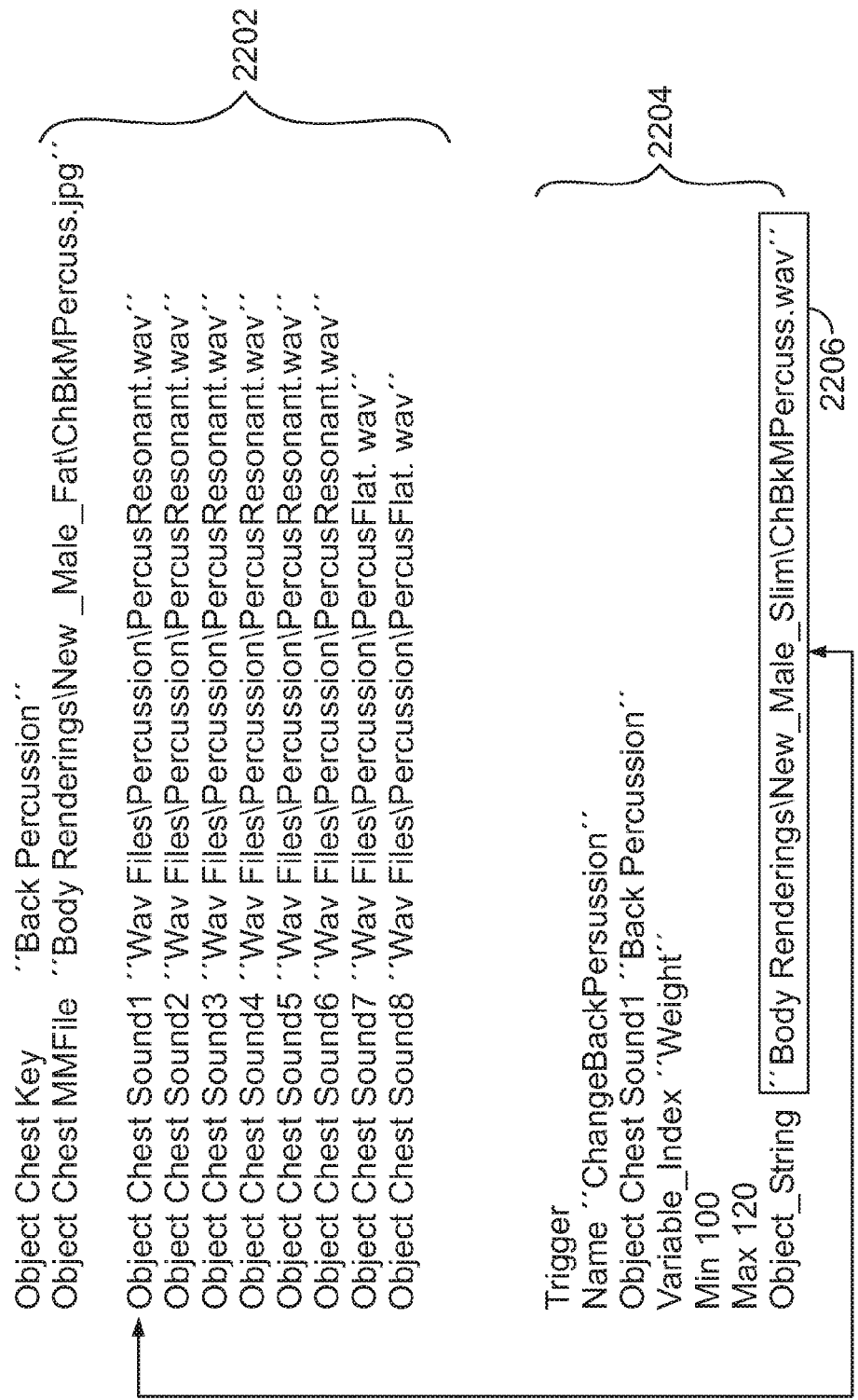
FIG. 22 is a diagram illustrating a change of a multimedia presentation associated with a virtual patient.
Figures 23, 24:
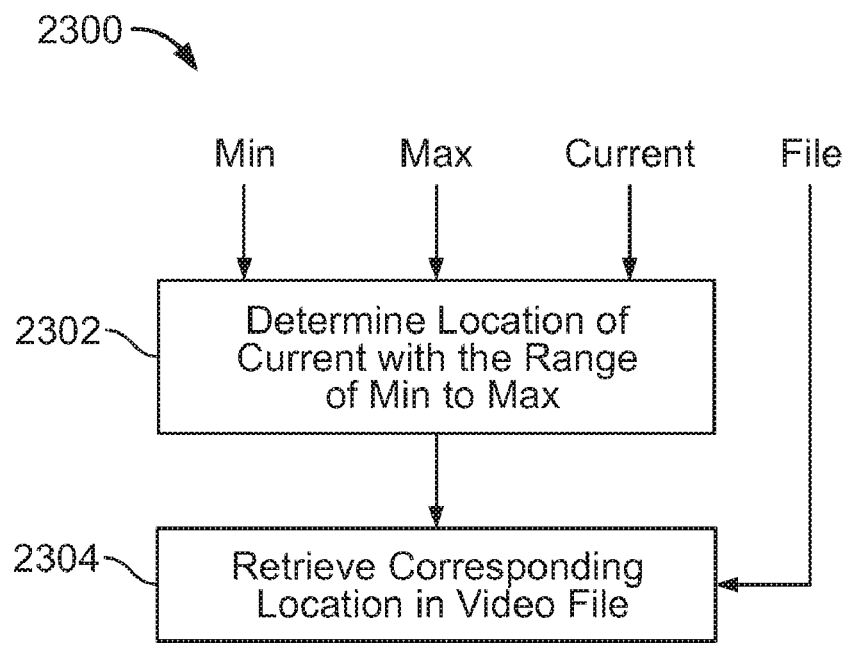
FIG. 23 is a flowchart of a process for morphing a virtual patient.
FIG. 24 is a listing of statements defining a morphing operation.
Figures 25, 26:
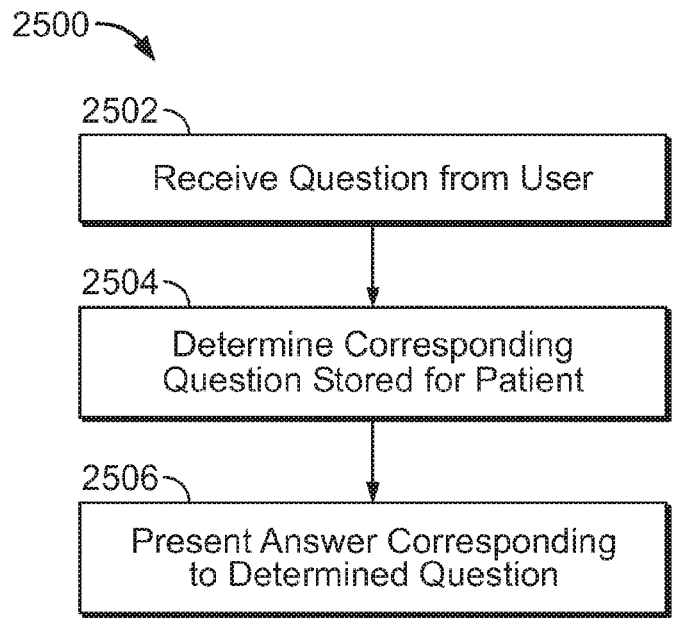
FIG. 25 is a flowchart of a process for providing virtual patient responses to questions.
FIG. 26 is a listing of statements defining virtual patient answers to questions.
Figure 31:
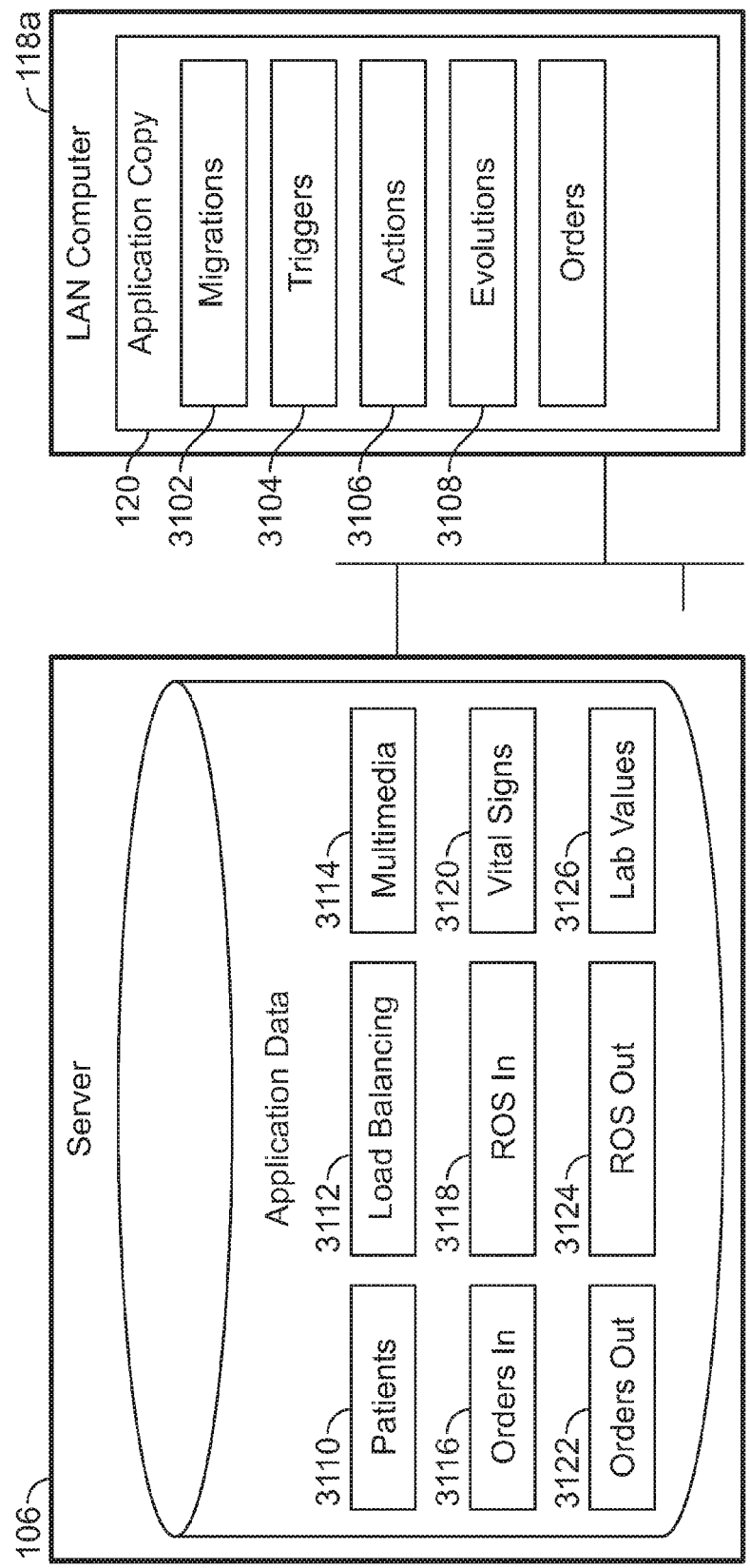
FIG. 31 is a diagram of a virtual patient simulator using the network application architecture.

As shown in FIG. 7, a browser (or other client) receives and processes the generated instructions or data 152 to present the specified pictures, text, or sounds to a user. Though the browser receives discrete sets of web-page instructions, the resulting sequence of displays is nearly indistinguishable from that of an ordinary desktop application. The instructions may also feature applets 154, ActiveX controls, or other programmatic instructions. These instructions can provide fast, direct updating of multimedia elements of an interface. For example, instead of requesting reconstruction of an entire new set of interface instructions, an applet may establish a JDBC (Java Database Connectivity) connection to the data stored on the server 106 and continually replace an image on the interface with a new image. For example, the applet may quickly present a series of images of a patient when the patient's health rapidly improves.

The system 100 described in FIGS. 1-7 can be used to provide a wide variety of applications. For example, the system 100 can be used to provide a simulation of a virtual patient to different users on the Internet.

Embodiments

The techniques described here are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferable stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

The details of one or more embodiments of the invention are set forth in the accompanying drawings and the description below. Other features, objects, and advantages of the invention will be apparent from the description and drawings, and from the claims.

A number of embodiments of the invention have been described. Nevertheless, it will be understood that various modifications may be made without departing from the spirit and scope of the invention. Accordingly, other embodiments are within the scope of the following claims.

What is claimed is:

1. A method of providing a software simulation application to different network clients from a server, the method comprising:

maintaining one or more sets of state data, the state data describing states of instances of simulation applications, the simulation applications being run on remote computers connected to the server via a local area network, the instances providing information generated by the simulation applications to one or more network clients connected to the server through a global network, the remote computers being different from the network clients;

generating interface instructions based on the one or more sets of state data, the interface instructions controlling display of the information at the one or more network clients;

updating the sets of state data in accordance with the simulation applications, while controlling execution speed of the application based on the speed of a user's connection to the server or how frequently the user interacts with an interface generated by the interface instructions;

and transmitting the interface instructions to the one or more network clients.

2. The method of claim 1, wherein the global network comprises the Internet.

3. The method of claim 1, wherein the clients comprise web-browsers.

4. The method of claim 1, wherein application interface instructions are dynamically generated.

5. The method of claim 4, wherein the interface instructions comprise HTML (HyperText Markup Language) instructions.

6. The method of claim 4, wherein generating interface instructions comprise processing a script.

7. The method of claim 6, wherein the script comprises a PHP (Personal Home Page) script.

8. The method of claim 4, wherein generating interface instructions comprises generating instructions including applets.

9. The method of claim 8, wherein the applets access the server to update features of the interface.

10. The method of claim 1, further comprising
receiving data from a client; and
wherein generating application interface instructions comprises generating application interface instructions in response to the received data.

11. The method of claim 1, further comprising
receiving a request from a client for access to the application; and
selecting an application on the local area network computers responsible for the client.

12. The method of claim 11, wherein selecting comprises selecting to load-balance between applications based on how many different instances each application currently handles and speed of the local area network computer running the application.

13. The method of claim 1, wherein the server communicates with the computers by:
setting a handshake flag indicating user input requires an application to process the input and after the application process the input, the application resets the handshake flag; and wherein generating a new interface occurs after the application resets the handshake flag.

14. The method of claim 13, wherein the simulator comprises a medical patient simulator.

15. The method of claim 1, further comprising
receiving data from a client; and
modifying the set of state data corresponding to the client's instance based on the received data.

16. A method comprising:
providing information generated by a virtual patient software simulator to different web browser clients connected to a server via a global network, providing information includes:
maintaining one or more sets of state data, the state data describing states of a virtual patient generated by the simulator, the simulator being run on remote computers in communication with the server;
dynamically generating, HTML (Hypertext Markup Language) instructions based on the one or more sets of state data, the instructions controlling display of the information at the web browser clients,
updating the sets of state data in accordance with virtual patient simulators running on one or more remote computers connected to the server via a local area network, while controlling execution speed of the application based on the speed of a user's connection to the server or how frequently the user interacts with an interface generated by the HTML instructions; and
transmitting the generated HTML instructions to one or more of the web browser clients to construct an interface that depicts a state of the virtual patient simulator running on the corresponding computer and controls to further modify a subsequent state of the virtual patient.

17. A computer program product, disposed on a computer readable medium, for providing a software application to different network clients from a server, the program including instructions for causing a processor to:
maintain sets of state data, the state data describing the states of instances of applications, the applications being run on remote computers connected to the server via a local area network, the instances providing information generated by the applications to one or more network clients connected to the server through a global network, the remote computers being different from the network clients;
generate interface instructions based on the sets of state data the interface instructions controlling display of the information at the network clients,
update the sets of state data based on the information received from the applications running on the remote computers, while controlling execution speed of the application based on the speed of a user's connection to the server or how frequently the user interacts with an interface generated by the interface instructions; and
transmit the generated interface instructions to the network clients to construct interfaces that depict states of the virtual patient and controls to further modify a subsequent states of the virtual patient.

18. The computer program of claim 17, wherein the global network comprises the Internet.

19. The computer program of claim 17, wherein the clients comprise web-browsers.

20. The computer program of claim 17, wherein the instructions that generate an interface comprises instructions that dynamically generate application interface instructions.

21. The computer program of claim 20, wherein the interface instructions comprise HTML (HyperText Markup Language) instructions.

22. The computer program of claim 20, wherein the instructions that generate interface instructions comprise instructions that process a script.

23. The computer program of claim 22, wherein the script comprises a PHP (Personal Home Page) script.

24. The computer program of claim 20, wherein the instructions that generate interface instructions comprises instructions that generate instructions including applets.

25. The computer program of claim 24, wherein the applets access the server to update features of the interface.

26. The computer program of claim 17, further comprising instructions that:
receive data from a client; and
wherein the instructions that generate application interface instructions comprise instructions that generate in response to the received data.

27. The computer program of claim 17, further comprising instructions that
receive a request from a client for access to the application; and
select an application on the local area network computers responsible for the client.

28. The computer program of claim 27, wherein the instructions that select comprise instructions that select to load-balance between applications.

29. The computer program of claim 17, wherein the application comprises a simulator.

30. The computer program of claim 29, wherein the simulator comprises a medical patient simulator.

31. The computer program of claim 17, further comprising instructions that:
receive data from a client; and
modify the set of state data corresponding to the client's instance based on the received data.

32. A system for providing an application to different network clients, the system comprising:
one or more copies of application instructions operating on one or more remote computers connected to a local area network;
a server connected to the remote computers via the local area network and to the network clients via a global network, the remote computers being different from the network clients, the server comprising:
a database that maintains sets of state data, the state data corresponding to a states of instances of the application instructions, the instances providing information generated by the application instructions to the network clients;
interface instructions for generating interfaces for the network clients based on the sets of state data, the interface instructions included in the application:
instructions for causing the server to change the sets of state data based on the information received from the application instructions over the local area network, while controlling speed of execution of the application based on a speed of a user's connection to the server or how frequently the user interacts with an interface generated by the interface instructions;
and
instructions for transmitting the interface instructions to the network clients.

* * * * *